July 15, 1969 J. C. LITTMANN 3,455,418
TORQUE RESPONSIVE PARKING BRAKE
Original Filed Aug. 2, 1965 2 Sheets-Sheet 1
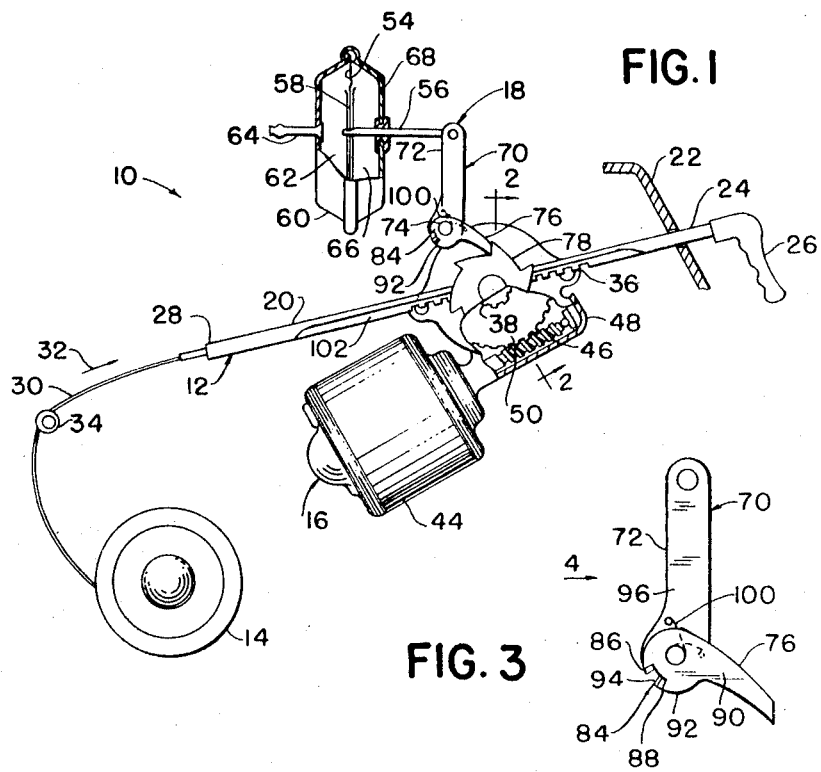
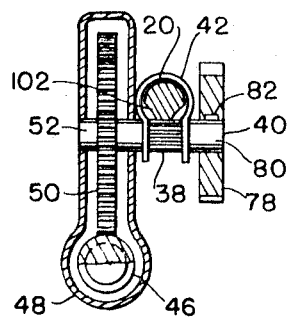
INVENTOR.
JOSEPH C. LITTMANN
BY Whittemore,
Hulbert & Belknap
ATTORNEYS July 15, 1969  J. C. LITTMANN  3,455,418
TORQUE RESPONSIVE PARKING BRAKE
Original Filed Aug. 2, 1965  2 Sheets-Sheet 2

INVENTOR
JOSEPH C. LITTMANN
BY
ATTORNEYS

United States Patent Office 3,455,418
Patented July 15, 1969

3,455,418
TORQUE RESPONSIVE PARKING BRAKE
Joseph C. Littmann, Grosse Pointe Woods, Mich., assignor to Ferro Manufacturing Corporation, Detroit, Mich., a corporation of Michigan
Original application Aug. 2, 1965, Ser. No. 476,302, now Patent No. 3,348,638, dated Oct. 24, 1967. Divided and this application July 17, 1967, Ser. No. 653,748
Int. Cl. F16d 65/32, 65/34; H0h 35/02
U.S. Cl. 188—162                                    8 Claims

ABSTRACT OF THE DISCLOSURE

Power actuated parking brake structure including means for power setting and releasing the parking brake. The power setting means includes torque responsive structure for setting the parking brake with a predetermined force in response to momentary closing of a single switch.

REFERENCE TO RELATED APPLICATION

The present application is a division of patent application, Ser. No. 476,302, filed Aug. 2, 1965, now U.S. Patent No. 3,348,638.

BACKGROUND OF THE INVENTION

Field of the invention

The invention relates to brakes and refers more specifically to a torque responsive power parking brake for an automobile or the like constructed to be actuated in response to momentary closing of a switch.

Description of the prior art

Automobiles today are generally equipped with a parking brake. The parking brake is usually set on parking of the automobile, particularly if the automobile is parked on an incline and is released before subsequent driving of the automobile.

Prior parking brakes have almost universally been manually set and manually released. With many parking brakes the manual setting and release thereof has required considerable strength which is undesirable. Also, there is a tendency to forget about the parking brake being set on entering an automobile so that automobiles have sometimes been driven considerable distances with the parking brake set which is detrimental to the brake system.

SUMMARY OF THE INVENTION

It is therefore an object of the invention to provide improved parking brake structure for power setting and power release of a parking brake.

Another object is to provide a power actuated parking brake wherein the setting of the brake is controlled by a torque responsive switch operable to insure uniform setting of the brake.

Another object is to provide a power actuated parking brake wherein brake setting is accomplished on momentary closing of a single switch.

Another object is to provide a power actuated parking brake which is simple in construction, economical to manufacture and efficient in use.

BRIEF DESCRIPTION OF THE DRAWINGS

FIGURE 1 is a diagrammatic view of a parking brake constructed in accordance with the invention.

FIGURE 2 is an enlarged section view of a portion of the parking brake illustrated in FIGURE 1 and taken substantially on the line 2—2 in FIGURE 1.

FIGURE 3 is an enlarged elevation view of a portion of the brake release mechanism of the parking brake illustrated in FIGURE 1.

FIGURE 4 is a side view of the portion of the brake release mechanism illustrated in FIGURE 3 taken in the direction of arrow 4 in FIGURE 3.

DESCRIPTION OF THE PREFERRED EMBODIMENTS

Figure 5:
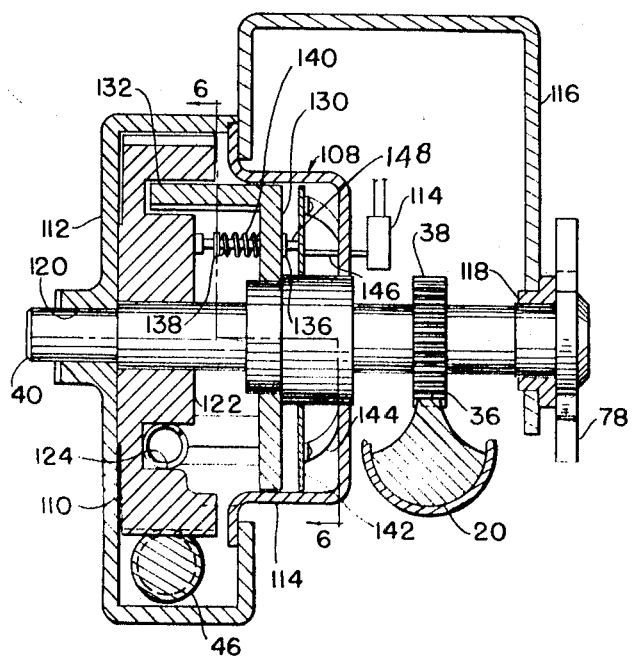
FIGURE 5 is an enlarged section view of a portion of a modified parking brake similar to that shown in FIGURES 1–4 taken substantially on the line 5—5 in FIGURE 6.

As shown best in FIGURE 1, the power actuated parking brake 10 includes the structure 12 movable longitudinally to actuated the brake 14, electro-mechanical apparatus 16 for moving the brake actuating structure 12 to set the brake 14 and the engine vacuum actuated mechanism 18 for power release of the brake actuating structure 12 to release the brake 14.

The brake actuating structure 12 is constructed and arranged to permit manual release of the brake 14, if required.

More specifically the brake actuating structure 12 of the power actuated parking brake 10 includes the axially movable rod 20 extending through the dashboard 22 of a vehicle at end 24 and having thereon the manual actuating handle 26. The other end 28 of rod 20 is connected to a brake setting cable 30 which on movement in the direction of arrow 32 about pulley 34 will cause the brake 14 to be set. Rod 20 further includes the rack teeth 36 therein held in engagement with the pinion portion 38 of shaft 40 by means of bracket 42 best shown in FIGURE 2, the ends of which are positioned over the shaft 40.

The electromechanical brake setting apparatus 16 includes the unidirectional electric motor 44 positioned to drive the worm 46 rotatably mounted in the housing 48 in engagement with the worm gear 50. The worm gear 50 is secured to end 52 of shaft 40 for rotation therewith by convenient means, such as a key (not shown).

The vacuum actuated brake release mechanism 18 includes the vacuum actuating diaphragm 54 to which the connecting rod 56 is secured by means of plates 58 secured between the two parts of the diaphragm housing 60. The chamber 62 formed within the diaphragm housing 60 is connected by convenient means, such as conduit 64 to engine manifold vacuum, while the chamber 66 is open to atmosphere through the port 68.

The pawl structure 70 of the vacuum actuated brake release mechanism 18 includes the lever member 72 pivotally connected to the connecting rod 56 for pivotal movement about the fixed pivot 74. The pawl member 76 is also pivotally mounted on the fixed pivot 74 and operably engages the ratchet wheel 78 secured to the end 80 of the shaft 40 by convenient means, such as key 82.

A lost motion connection 84 is provided between the lever member 72 and pawl member 76, as shown best in FIGURES 3 and 4. The lost motion connection includes the tabs 86 and 88 extending from the side 90 of the pawl member 76 at the periphery of the heel portion 92 thereof. A longer tab 94 extends from the side 96 of the lever member 72 into the space 98 between the tabs 86 and 88 for movement therebetween. Spring 100 is provided acting between the lever member 72 and pawl member 92 to urge the pawl member 92 in a clockwise direction, as shown in FIGURE 1, so that the tab 94 is normally in engagement with the tab 88.

In over-all operation of the parking brake structure 10, when it is desired to set the brake 14, the electric motor 44 is energized to rotate the worm 46, worm gear 50 and shaft 40 in a direction to move the rod 20 engaged with the pinion portion 38 of the shaft 40 in the direction of arrow 32. During this movement of the rod 20 to set the brake 14, the ratchet wheel 78 is rotated and the pawl member 76 cams over the ratchet teeth while moving within the limits of movement of the lost motion connection 84 between the lever member 70 and pawl member 76. The pawl member 76 during this time is urged by spring 100 into engagement with the ratchet wheel 78.

On stopping of the motor 44 the rod 20 in engagement with the pinion 38 is thus prevented from moving to the left in FIGURE 1 to release the brake 14 due to the engagement of the pawl member 76 with the ratchet wheel 78 which in turn is keyed to the shaft 40.

When the engine (not shown) of the vehicle in which the parking brake 10 is mounted is subsequently started and the shifting mechanism of the vehicle is placed in a drive position vacuum will be drawn in chamber 62 through conduit 64 connected to an engine vacuum source through a valve on the vehicle shifting mechanism (not shown), to move the connecting rod 56 to the left in FIGURE 1, thus rotating the lever member 72 in a counterclockwise direction with the tabs 88 and 94 of the lost motion connection 84 in engagement to move the pawl member 76 out of engagement with the ratchet wheel 78. The pressure of the set brake 14 on cable 30 will cause rod 20 to move to the left and the brake 14 will be released. This requires of course the use of a worm 46 and worm gear 50 which may be driven in reverse by applying a rotational force to shaft 40 and worm gear 50. Such worm and worm gear combinations are readily obtained commercially.

Should the brake release mechanism fail to operate as will be evidenced by the extension of end 24 of the rod 20 through the dashboard 22, the handle 26 may be gripped and turned to permit the recesses 102 provided in the sides of the rod 20 to move into position over the pinion portion 38 of shaft 40. The rod 20 will then be drawn to the left in FIGURE 1 by the force on the cable 30 to release the brake 14. The handle 26 may then be returned to the vertical position to reengage the rack teeth 36 on rod 20 and the pinion portion 38 of shaft 40. Thus manual release of the power actuated parking brake 10 is provided for.

Figure 7:
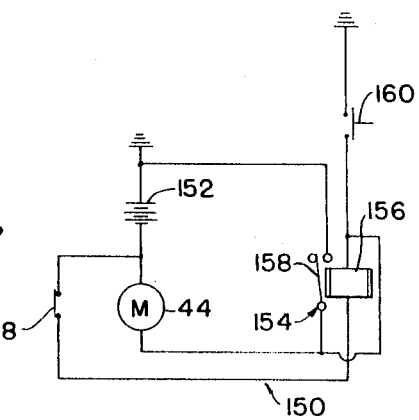
FIGURE 7 is a schematic diagram of a control circuit for the modified parking brake illustrated in FIGURES 5 and 6.
Figure 6:
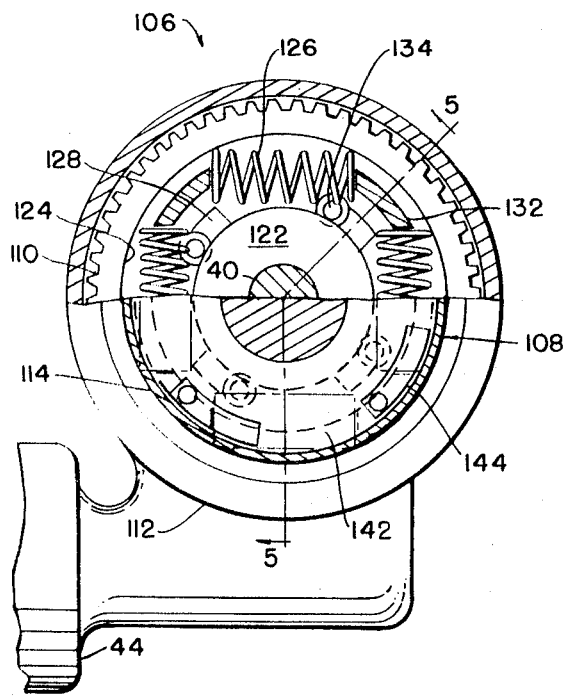
FIGURE 6 is a section view of the portion of the modified parking brake illustrated in FIGURE 5 taken substantially on the line 6—6 in FIGURE 5.

The modified parking brake structure 106 illustrated in FIGURES 5–7 includes torque actuated switching structure 108 for deenergizing the brake actuating motor 44 during brake setting to insure the uniform and full setting of the brake 14 at all times.

The parking brake structure 106 is similar to the parking brake structure 10 except as shown in FIGURES 5–7 and includes the ratchet wheel 78, shaft 40 having pinion portion 38 thereon engageable with the rack teeth 36 on rod 20 as before. Again the motor 44 drives the worm 46 in one direction to impart rotation to the modified worm gear 110.

In accordance with the modified brake structure 106 a housing 112 is provided for the worm gear 110, a cover 114 is provided on the housing 112 and a bracket 116 is secured to the cover 114 for supporting the bushing 118. The shaft 40 is rotatably mounted in the opening 120 in the housing 112 and the bushing 118, as shown in FIGURE 5.

The worm gear 110 is mounted on shaft 40 for rotation with respect thereto and is provided with a recessed inner side 122. An annular recess 124 is provided in the recessed side 122 of the worm gear 110 in which four evenly spaced apart helical springs 126, illustrated best in FIGURE 6, are fixed in position. Four camming ramps 128 are provided on the surface 122 of the gear 110 between the springs 126 and radially inwardly thereof, as shown best in FIGURE 6.

A torque plate 130 is connected to the shaft for rotation with the shaft 40 in contrast to the worm gear 110 which rotates on the shaft 40. The plate 130 is provided with four angularly spaced apart equally separated fingers 132 which extend into the annular recess 124 in the worm gear 110 between and in engagement with the springs 126 therein. The springs 126 may be prestressed.

A cam pin 134 having the radially extending portions 136 and 138 extends through the torque plate 130 and is spring biased into contact with one of the ramps 128 by spring means 140 at four positions around the torque plate 130 in alignment with the ramps 128 on the worm gear 110, as shown best in FIGURES 5 and 6.

The spider plate 142 is positioned over the shaft 40 for axial movement therealong and is biased toward the torque plate 130 and into engagement with the cam pins 134 by means of the resilient fingers 144 in engagement with the housing cover 114. A dowel 146 is secured to the spider plate 142 for movement axially of the shaft 40 to close the switch 148 on movement of the spider plate 142 to the right in FIGURE 5 on the shaft 40.

The operation of the torque actuated switching structure 108 on setting of the modified parking brake structure 106 will be considered in conjunction with the schematic diagram illustrated in FIGURE 7 of a control circuit for the modified parking brake structure 106. The switch 148 and the parking brake actuating motor 44 are included in the schematic diagram 150. A source of electric energy 152 which may be the automobile battery, a two position relay 154 having coil 156 and contacts 158, and a dashboard mounted push button 160 are also included in the schematic diagram of FIGURE 7.

In operation, the push button 160 is pressed to energize relay coil 156 and move the contacts 158 from the open position to a closed position whereby the motor 44 is connected to ground and is energized by the battery 152. The push button 160 may then be released with the coil 156 being energized through the battery 152, torque actuated switch 148 and closed relay contacts 158. The worm 46 is thus driven in a direction to drive the shaft 40 through worm gear 110 and torque plate 130 to move the rod 20 in a brake setting direction.

When the brake 14 has been set the rod 20 will provide a sufficient resistance to rotation of the shaft 40 through the rack and pinion connection therebetween to overcome the resistance to relative rotation between the torque plate 130 and worm gear 110 offered by the springs 126. The springs 126 will then compress allowing relative rotation between the torque plate 130 and worm gear 110 whereupon the cam pins 134 will be cammed to the right in FIGURE 5 on camming ramps 128 in opposition to the bias applied thereto by the springs 140.

The spider plate 142 will thus be moved to the right in FIGURE 5 by the pins 134 so that the switch 148 will be opened by the dowel 146. Opening the switch 148 will deenergize the relay coil 156 causing the contacts 158 of the relay 154 to open, deenergizing the motor 44. The shaft will now be rotated into a position in which the brake 14 is uniformly and fully set. Release of the brake structure 106 is accomplished as before.

What I claim as my invention is:

1. A parking brake for an automobile or the like, including brake actuating structure, power setting apparatus connected to the actuating structure for moving the brake actuating structure to actuate the brake on energization thereof, an electrical energizing circuit for the power setting appartaus operably associated with the power setting apparatus, including a torque actuated electrical switch connected to the power setting apparatus and connected in the energizing circuit for opening the energizing circuit on setting of the brake with a uniform force.

2. Structure as set forth in claim 1 wherein the energizing circuit further includes means for energizing the power setting apparatus to set the brake with a uniform force on closing and then immediately opening a single switch.

3. Structure as set forth in claim 1 and further including brake release means engaged with the power setting apparatus for releasing the power setting apparatus.

4. A power actuated parking brake including a movable member, a cable connected to said movable member and to a brake operable to set said brake when said movable member is moved in one direction and to release the brake when said movable member is moved in the other direction, rotatable means connected to said movable member for moving the movable member in a brake setting direction on rotation of the rotatable means in one direction, motor means for rotating the rotatable means in said one direction, a circuit for selectively energizing said motor means, switch means in said circuit and responsive to the torque applied to said rotatable means for breaking said circuit to deenergize said motor means at a predetermined torque on the rotatable means.

5. Structure as set forth in claim 4 and further including means connected to the parking brake for releasing the movable member to release said brake.

6. Structure as set forth in claim 4 wherein said movable member is a rod having a rack portion extending longitudinally thereof, said rotatable means includes a pinion engaged with said rack portion of the rod and a recess extending longitudinally of said rod adjacent the pinion for receiving the pinion on rotation of the rod to release the rod from the rotatable means.

7. Structure as set forth in claim 4 wherein the rotatable means includes a shaft, a worm gear mounted for rotation on said shaft and having an annular recess in one side thereof and camming ramps on the one side thereof and the switch means includes a torque plate secured to the shaft for rotation therewith having fingers thereon extending into the anular recess in said worm gear, spring means fixed in angularly spaced apart predetermined positions within the annular recess engaged with said fingers, a plurality of cam pins extending through said torque plate in alignment with the camming ramps on said worm gear, resilient means biasing the pins into engagement with the ramps, a spider plate positioned over the shaft on the side of the torque plate opposite the worm gear biased into engagement with said camming pins, an electric switch positioned adjacent the spider plate and a switch actuating dowel secured to the spider plate and engaged with said switch whereby on application of torque between the worm gear and torque plate sufficient to overcome the force of said spring means the torque plate will rotate relative to the worm gear to cam the cam pins in a direction to move the spider plate toward the switch so that the switch is actuated by the dowel.

8. Structure as set forth in claim 5 wherein the means for releasing said movable member includes a pivotally mounted bell crank lever and the ends of the bell crank lever are separately rotatable about the pivot mounting of the bell crank lever, lost motion structure is provided between the ends of the bell crank lever for limiting the relative rotation thereof, and resilient means are provided urging the ends of the bell crank lever into a predetermined position wherein one end of the lever is permitted movement with respect to the other end of the lever in opposition to said resilient means on rotation of said ratchet means a predetermined amount within the lost motion allowed between the ends of the bell crank and movement of the other end of the bell crank will substantially immediately produce movement of the one end.

References Cited

UNITED STATES PATENTS

| | | | |
|---|---|---|---|
| 2,251,521 | 8/1941 | McIntryre et al. | 188—162 |
| 2,734,590 | 2/1956 | Hays. | |
| 2,933,159 | 4/1960 | Stiebinger | 188—162 X |
| 3,204,725 | 9/1965 | McGraw | 188—3 |
| 3,270,840 | 9/1966 | De Claire | 188—106 X |

DUANE A. REGER, Primary Examiner

U.S. Cl. X.R.

188—106; 200—61.45